Figure 1:
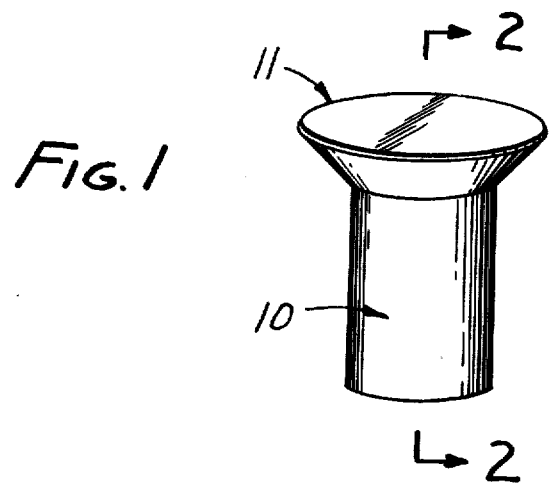

United States Patent

Sekhon

[11] 3,983,304
[45] Sept. 28, 1976

[54] FASTENER WITH PROTECTIVE METAL-ORGANIC BASE COATING

[75] Inventor: Jagdish S. Sekhon, Fountain Valley, Calif.

[73] Assignee: Hi-Shear Corporation, Torrance, Calif.

[22] Filed: Jan. 26, 1976

[21] Appl. No.: 652,620

Related U.S. Application Data

[60] Division of Ser. No. 398,652, Sept. 19, 1973, and a continuation-in-part of Ser. No. 327,069, Jan. 26, 1973, abandoned.

[52] U.S. Cl. .............................. 428/460; 428/469; 428/542; 427/388 B; 427/388 D; 29/34 B; 29/5; 151/14 R
[51] Int. Cl.² ........................................ B32B 15/08
[58] Field of Search ................ 428/542, 460, 469; 260/32.8 R, 37 M, 38, 33.4 R, 33.6 R; 427/388 B, 388 D

[56] References Cited
UNITED STATES PATENTS
3,922,449  11/1975  Bolger.............................. 428/542

Primary Examiner—Harold Ansher
Assistant Examiner—Patricia C. Ives
Attorney, Agent, or Firm—D. Gordon Angus; Donald D. Mon

[57] ABSTRACT

A fastener such as a rivet, bolt or screw is provided with a protective coating for protection against corrosion and deterioration, formed by application of a mixture of a powdered metallic substance such as powdered aluminum or molybdenum disulfide with a phenol-formaldehyde resin in a volatile carrier from the group consisting of lower alkyl alcohols, methyl ethyl ketone and petroleum distillate, such as toluene or ethyl alcohol, or both, together with strontium chromate and zinc chromate. Either teflon or fatty amido diamine is added to the foregoing mixture. The thickness of the coating after drying can be made very thin and controlled to a high degree and possesses sufficient toughness and lubricity so that it is not damaged even when used on interference type fasteners.

11 Claims, 2 Drawing Figures

FASTENER WITH PROTECTIVE METAL-ORGANIC BASE COATING

This is a division of application Ser. No. 398,652, filed Sept. 19, 1973.

This invention is a continuation-in-part of my copending application Ser. No. 327,069 filed Jan. 26, 1973 now abandoned.

This invention relates to protective coatings and to fasteners coated by them, and more particularly to such coatings and fasteners capable of protecting one or both of two dissimilar metals assembled together, from structural corrosion or deterioration.

The invention is applicable to use with a number of different metals and combinations of metals. It is especially applicable to the coating of titanium. A particular application relates to titanium fasteners commonly used in the aluminum structures of aircraft and the like.

It is common practice to assemble aluminum or aluminum alloy structures, such as those of aircraft, with high strength fasteners of titanium or titanium alloys. It is well-known that galvanic action due to electrochemical coupling effects present in such assemblies often results in undesirable corrosion of the aluminum or titanium elements, or both. It is known that aluminum has a tendency for galvanically induced corrosive attack in contact with titanium, if wet. Furthermore, the corrosion susceptibility of these structures is increased by harsh saline or acidic environments frequently encountered. When the fasteners are of the interference-fit type such as commonly used in the aircraft industry, the problem is further compounded by the fact that a coating on a fastener must be tough and adherent enough to withstand the force fitting operation. Such coatings must also be held to close tolerances.

A number of expedients have heretofore been proposed to reduce or eliminate such galvanic corrosion, among which have been: plating the fasteners with cadmium or aluminum; substitution of steel for titanium fasteners; coating the fasteners with organic or inorganic coatings; use of wet primers or elastomeric sealants during installation; and coating the fasteners or structural exteriors with paint such as a zinc chromate type. Chemicals including phosphates, molybdates, silicates and chromates of some metals have also been found effective as corrosion inhibitors.

The several types of coatings and corrosion inhibitors heretofore used have presented problems such as failing to give complete protection, inadequate toughness or adherence, and excessive expense. Even those most widely used in the aircraft industry, namely cadmium plating, organic and inorganic coatings, and sealants have been less than completely satisfactory. The organic and inorganic type coatings act mainly as a physical barrier against salt, moisture and the like without providing substantial corrosion protection. Cadmium plated fasteners and wet installation approaches, although finding considerable success in inhibiting corrosion of aluminum structures, have other undesirable limitations. Recent technical literature has shown an embrittling effect of titanium and high strength steel in direct contact with cadmium. Wet installation imposes undesirably high cost of assembly and presents production adaptability problems and the like.

An object of the invention is to provide a protective coating which can be applied to a substrate of a metal or metals including fasteners and which is smooth and highly adherent.

A related object is to provide such a coating and coated fastener which is resistant to common hydraulic fluids, fuels, paint strippers and cleaning solvents and is heat resistant to high temperatures without inducing stress embrittlement.

Another related object is to provide such a coating material which is resistant to salt spray.

A further object is to provide such a coating which can be easily applied to a metal including a fastener by conventional methods as by spraying, dipping or brushing.

Another object is to provide such a coating whose thickness is controllable and possesses a good degree of lubricity, making it particularly applicable to interference-fit fasteners.

In accordance with the present invention there is provided a coating material having an aluminum-containing or molybdenum-dirivative-containing organic base giving greater corrosion protection than cadmium electro-deposits or other aluminum base coatings. The coating material furthermore possesses very high abrasion resistance and is characterized by good lubricity and relatively low friction, rendering it especially suited for use with interference-fit fasteners. Its unusually high density and its corrosion inhibiting feature both contribute to its corrosion resisting qualities. The coating material furthermore is especially adaptable to the application to the metal, such as a fastener, for example rivets, bolts and screws, of a permanent bonded coating film of uniform selected thickness, for example of the order of 0.0002 to 0.0005 inch in thickness, which contributes to its effectiveness for interference-fit fasteners. The coating film is also desirable for other types of fasteners, including threaded fasteners, for insuring proper thread fit. The coating material is useful for coating other items than fasteners, including alloy steel parts and high temperature tool steel.

Figure 2:
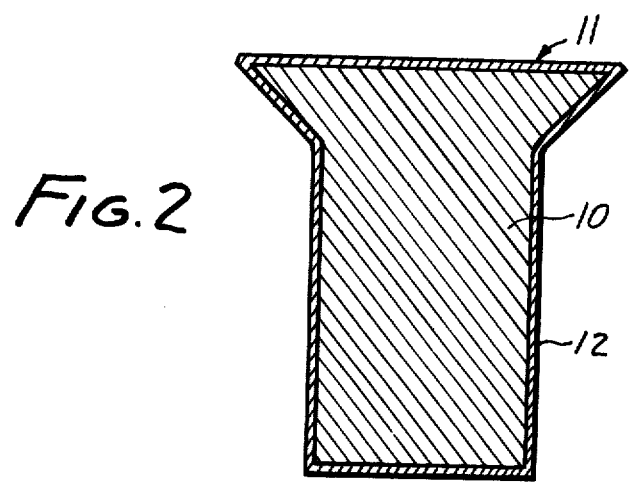

In the drawing,

FIg. 1 is an isometric view of a fastener coated by a protective coating according to this invention; and FIG. 2 is a cross-section view taken at line 2—2 of FIG. 1.

The drawing illustrates a typical rivet type fastener of the type commonly used in an aircraft frame. The fastener comprises a shank 10 and a head 11, all of a solid metal, which may be of a type referred to above, and the entire surface of the rivet is coated by a protective coating 12 according to this invention. The rivet is assumed to be of the interference type so that the exterior surface at the coating 12 at the shank is slightly greater than the hole of the sheet or other structural material into which it is to be forced as by pressing or hammering on the head. This forcing of the rivet into the hole produces great frictional stress on the coating. The coating must effectively resist this abrasive stress as well as resist the corrosive effects described above.

Coating mixtures according to this invention useful for the coating of such fasteners comprise a powdered metal or metallic derivative which may be either powdered aluminum or powdered molybdenum disulfide ($MoS_2$) suspended in a phenol-formaldehyde thermosetting resin, which is dissolved in a volatile solvent carrier giving the mixture a liquid consistency but providing fast drying after application. The solvent may be a lower alkyl alcohol such as methyl, ethyl, propyl or isopropyl alcohol or a similar solvent such as methyl, ethyl ketone or a petroleum distillate in the volatile solvent range such as xylene or toluene, or mixtures of two or more of these solvents. The coating mixture also includes a metallic chromate such as strontium or zinc chromate and mixtures thereof. For many applications it is also preferable to include polytetrafluoroethylene available under the trademark teflon. For special applications, it is desired to include also a cation-type wetting agent such as fatty amido diamine, in which case the teflon will generally be omitted.

Where aluminum powder is used for the filler it should have a grain fineness of 200 to 400 mesh or finer, 400 mesh or finer being preferred where coating thicknesses must be controlled to less than 0.001 inch, as in the case of many fasteners. Where molybdenum disulfide is used for the filler it should have a grain fineness between 25 and 5 microns.

The ratio of the powdered filler to the mixture of resin and solvent can range from about 3 to 15 percent by weight and the ratio of the chromate to the mixture of the resin and solvent can range from about 2 to 4 percent by weight. Where polytetrafluoroethylene is used it can range from about 0.1 to 0.3 percent by weight of the mixture of the resin and solvent. The amount of solvent carrier used should be sufficient to provide a desired degree of liquidity, depending somewhat on whether it is to be applied by spraying, dipping or brushing.

An example of a typical coating composition according to this invention consists of a mixture of toluene and ethyl alcohol as the volatile solvent mixture, phenol-formaldehyde resin dissolved in it, aluminum powder, strontium chromate, zinc chromate and polytetrafluoroethylene. In a typical example these may be proportioned by mixing the toluene and ethyl alcohol in equal amounts by volume to form the volatile solvent, and dissolving the phenol-formaldehyde resin in this solvent in the proportion of 10–15% phenol-formaldehyde resin with 85–90% of the solvent by volume. To 1 gallon of this solution there is added the powdered aluminum in the amount of 225 grams, the strontium chromate in the amount of 120 grams, the zinc chromate in the amount of 20 grams and the polytetrafluoroethylene in the amount of 20 grams.

Variations may be made from this specific example, for instance, some or all of the toluene may be omitted from the solvent, or alternatively some or all of the ethyl alcohol may be omitted from the solvent, provided however that the volume amount of either the toluene or ethyl alcohol which is reduced or omitted is made up by the other. The powdered aluminum may vary from 200 to 225 grams to the gallon of the phenolic resin and solvent. The amount of the strontium chromate may vary between 80 and 120 grams to said gallon. The amount of zinc chromate may vary between 0 and 20 grams to the said gallon, hence it is possible to omit the zinc chromate entirely. Where polytetrafluoroethylene is used it should be present in the amount of 20 to 40 grams to the said gallon. It is possible to omit the polytetrafluoroethylene entirely at the sacrifice of some lubricity to the final coating composition.

In a second example of the composition there is used the same mixture of toluene and ethyl alcohol as in the first-mentioned example above, and likewise either the toluene or the ethyl alcohol may be reduced or entirely omitted provided the deficit is made up by the other. Phenol-formaldehyde resin is dissolved in the solvent in the same proportion of 10–15% of the resin to 85–90% of the solvent, by volume, as in the first-mentioned example. To 1 gallon of the solution of phenolic resin in the solvent, powdered molybdenum disulfide is added in the amount of 290 grams, strontium chromate is added in the amount of 80 grams and polytetrafluoroethylene is added in the amount of 40 grams. Variations in the amount of the molybdenum disulfide, strontium chromate and teflon are permissible. For example, the molybdenum disulfide may be present in the amount of 280 to 300 grams per gallon of the solution of the resin in the solvent, the strontium chromate may be present in the amount of 80 to 100 grams and the polytetrafluoroethylene may be present in the amount of 20 to 40 grams to the gallon of resin and solvent. If the polytetrafluoroethylene be omitted, the composition is still usable at the sacrifice of some lubricity of the final product.

Where the coating is to be applied to steel or alloy steel parts it will usually be desirable to use a cation-type wetting agent such as fatty amido diamine in the mixture and dispense with the polytetrafluoroethylene, as the introduction of fatty amido diamine results in a coating which exhibits superior corrosion resistance particularly in the presence of salt spray. As an example of this composition, 150 milliliters of phenol-formaldehyde resin is dissolved in 220 milliliters of ethyl alcohol and 80 milliliters of toluene. To this there is added 20 grams of strontium chromate, 20 grams of zinc chromate, 15 grams of aluminum powder and 5 to 20 milliliters of fatty amido diamine. The fatty amido diamine, which is a cation-type wetting agent, is available under the name Textamine C-18 from Textilana Corporation, Inglewood, California. This coating can be applied to high-temperature tool steels and alloy steels and will afford such steels superior corrosion protection as compared with the coating materials described in the first and second examples above.

A preferred manner for applying the coating material is by spraying, although either dipping or brushing can be used instead. Because of the volatility of the carrier solvent, it dries and solidifies quickly. Preferably it is baked after application to a fastener. It has been found that in the application of the coating material to a fastener the thickness of the solidified coating on the fastener can be held to between 0.0002 and 0.0005 inch. This thickness control is important and desirable particularly in the case of threaded fasteners to insure proper thread fit and in the case of aircraft quality interference or non-interference type fasteners. Interference-fit fasteners are commonly made by making their diameters slightly greater than that of the hole through the structural member to which it is to be fastened. In setting such a fastener it must therefore be forced through the hole, thereby causing some flow of metal with consequent abrasion of the coated surface of the fastener. It has been found that the coating applied according to this invention is capable of resisting the abrasion and maintaining its adherence to the fastener. This is facilitated by its somewhat lubricated texture augmented by the presence of the polytetrafluoroethylene. It is highly protective to both members of a bimetallic structural combination such as a titanium fastener attached to aluminum-type members. It effectively prevents deterioration due to galvanic action and is resistant to all common fluids and substances normally encountered in service. Furthermore, it does not induce embrittlement.

Although the coatings described herein have been described with particular reference to use as coatings for fasteners, the coatings are not limited to fasteners but may be applied generally to other surfaces requiring corrosion protection and lubrication. An example of the application of a coating to high-temperature tool steel or other parts of alloy steel have been noted above. Likewise it is not always necessary to apply coatings as thin as those which will ordinarily be applied to fasteners and thicker coatings may be in order for use with such other surfaces.

What is claimed is:

1. A fastener having an exterior coating of material comprising a mixture of: powdered metallic substance from the group consisting of aluminum and molybdenum disulfide, phenol-formaldehyde resin and metallic chromate in a carrier selected from the group consisting of lower alkyl alcohols, methy ethyl ketone and petroleum distillate from the group consisting of xylene and toluene, and mixtures thereof, said material, upon application to a metal surface, drying to form a coating which is tough, adherent, smooth and corrosion resistant.

2. A fastener according to calim 1 in which the powdered metallic substance is powdered aluminum, the metallic chromate is strontium chromate and the solvent carrier is a mixture of toluene and ethyl alcohol in equal amounts by volume, the proportion of the phenol-formaldehyde resin to the solvent carrier being 10–15% resin and 85–90% solvent by volume, the powdered aluminum being present in the range of 200 to 225 grams to one gallon of the resin and solvent carrier, and the strontium chromate being present in the range of 80 to 120 grams to 1 gallon of the resin and solvent carrier.

3. A fastener according to claim 2 in which zinc chromate is added in an amount up to 20 grams per gallon of the resin and solvent carrier and the powdered aluminum is present in the amount of 225 grams per gallon of the resin and solvent carrier, the strontium chromate is present in the amount of 120 grams per gallon of the resin and solvent carrier, the zinc chromate is present in the amount of 20 grams per gallon of the resin and solvent carrier and the polytetrafluroethylene is present in the amount of 20 grams per gallon of the resin and solvent carrier.

4. A fastener according to claim 1 in which the powdered metallic substance is molybdenum disulfide, the metallic chromate is strontium chromate, the carrier is a mixture of toluene and ethyl alcohol in equal amounts by volume, the proportion of the phenol-formaldehyde resin to the solvent carrier is 10–15% resin to 85–90% of the solvent carrier by volume, the molybdenum disulfide is present in the range of 280 to 300 grams per gallon of the resin and solvent carrier, the strontium chromate is present in the range of 80–100 grams to the gallon of the resin and solvent carrier and the molybdenum disulfide is present in the amount of 290 grams per gallon of the resin and solvent carrier, the strontium chromate is present in the amount of 80 grams to the gallon of resin and solvent carrier and polytetrafluoroethylene is added in the amount of 40 grams per gallon of the resin and solvent carrier.

5. A fastener according to claim 1 in which said exterior coating is baked.

6. A fastener according to claim 2 in which the exterior coating is baked.

7. A fastener according to claim 3 in which the exterior coating is baked.

8. A fastener according to claim 4 in which the exterior coating is baked.

9. A metallic part having an exterior coating of a material according to claim 1 which includes a cation-type wetting agent.

10. A metallic part according to claim 9 in which the exterior coating is baked.

11. A metallic part having an exterior coating of a material according to claim 1 which includes a cation-type wetting agent and in which the powdered metallic substance is powdered aluminum, the metallic chromate is strontium chromate and zinc chromate, the mixture being in the proportions of 150 milliliters phenol-formaldehyde resin, 220 milliliters ethyl alcohol, 80 milliliters toluene, 20 grams strontium chromate, 20 grams zinc chromate, 15 grams aluminum powder, and 5 to 20 milliliters of fatty amido diamine.

* * * * *